(12) United States Patent
Kim et al.

(10) Patent No.: US 7,076,095 B2
(45) Date of Patent: Jul. 11, 2006

(54) METHOD AND APPARATUS FOR SECTIONING IMAGE INTO PLURALITY OF REGIONS

(75) Inventors: Sang-kyun Kim, Kyungki-do (KR); Dmitry Nikolayev, Moscow (RU)

(73) Assignee: Samsung Electronics Co., Ltd., Suwon-Si (KR)

(*) Notice: Subject to any disclaimer, the term of this patent is extended or adjusted under 35 U.S.C. 154(b) by 933 days.

(21) Appl. No.: 09/983,032

(22) Filed: Oct. 22, 2001

(65) Prior Publication Data

US 2002/0102017 A1 Aug. 1, 2002

(30) Foreign Application Priority Data

Nov. 22, 2000 (KR) .......................... 2000-69490

(51) Int. Cl.
*G06K 9/00* (2006.01)

(52) U.S. Cl. .................... 382/164; 382/173; 382/225
(58) Field of Classification Search ............. 382/162, 382/164, 165, 166, 171, 173, 224, 225, 251; 358/538; 345/593, 591
See application file for complete search history.

(56) References Cited

U.S. PATENT DOCUMENTS 6,529,202 B1 * 3/2003 Wu ............................ 345/593

OTHER PUBLICATIONS

Dorin Comaniciu et al., "Distribution Free Decomposition of Multivariate Data", Pattern Analysis and Applications, 1999, vol. 2, pp. 22–30.

Pavel A. Chochia, "Two Tasks in Image Enhancement Technology" *Optical Memory and Neural Networks*, vol. 7, No. 1, 1998, pp. 37–50.

E. J. Carton, "Some Fundamental Texture Analysis Techniques" Univ of Maryland, Jan. 1974, pp. 27.

L. Van Gool, "Texture Analysis Anno" CVGIP 29, 1985, pp. 336–357.

* cited by examiner

*Primary Examiner*—Vikkram Bali
*Assistant Examiner*—Colin LaRose
(74) *Attorney, Agent, or Firm*—Burns, Doane, Swecker & Mathis, L.L.P.

(57) ABSTRACT

A method and apparatus for sectioning an image into a plurality of regions, by which regions of an image having various features can be extracted stably in a form similar to what humans can perceive, are provided. The method for sectioning an input image into a plurality of regions includes the steps of: converting each pixel of the input image into color coordinates in an arbitrary color space including a luminance (L) axis; forming a plurality of layers and a plurality of bins from the color space; if a distance between the centers of upper last and lower last circles determined using a color, a texture, and a position on an image plane for a pixel is less than a first threshold value, including the upper last and lower last circles in the same cluster and performing the above step on an adjacent lower layer; if the distance between the centers of the upper last and lower last circles is no less than the first threshold value or if the adjacent lower layer does not exist, partitioning the cluster using a last circle including the smallest number of pixels in the color space used in calculating an average color, an average texture, and an average position among the last circles included in the cluster; and performing the above steps on the remaining pixels not included in the upper last or the lower last circle and generating an image graph using clusters obtained for all pixels in the color space.

9 Claims, 12 Drawing Sheets

(3 of 12 Drawing Sheet(s) Filed in Color)

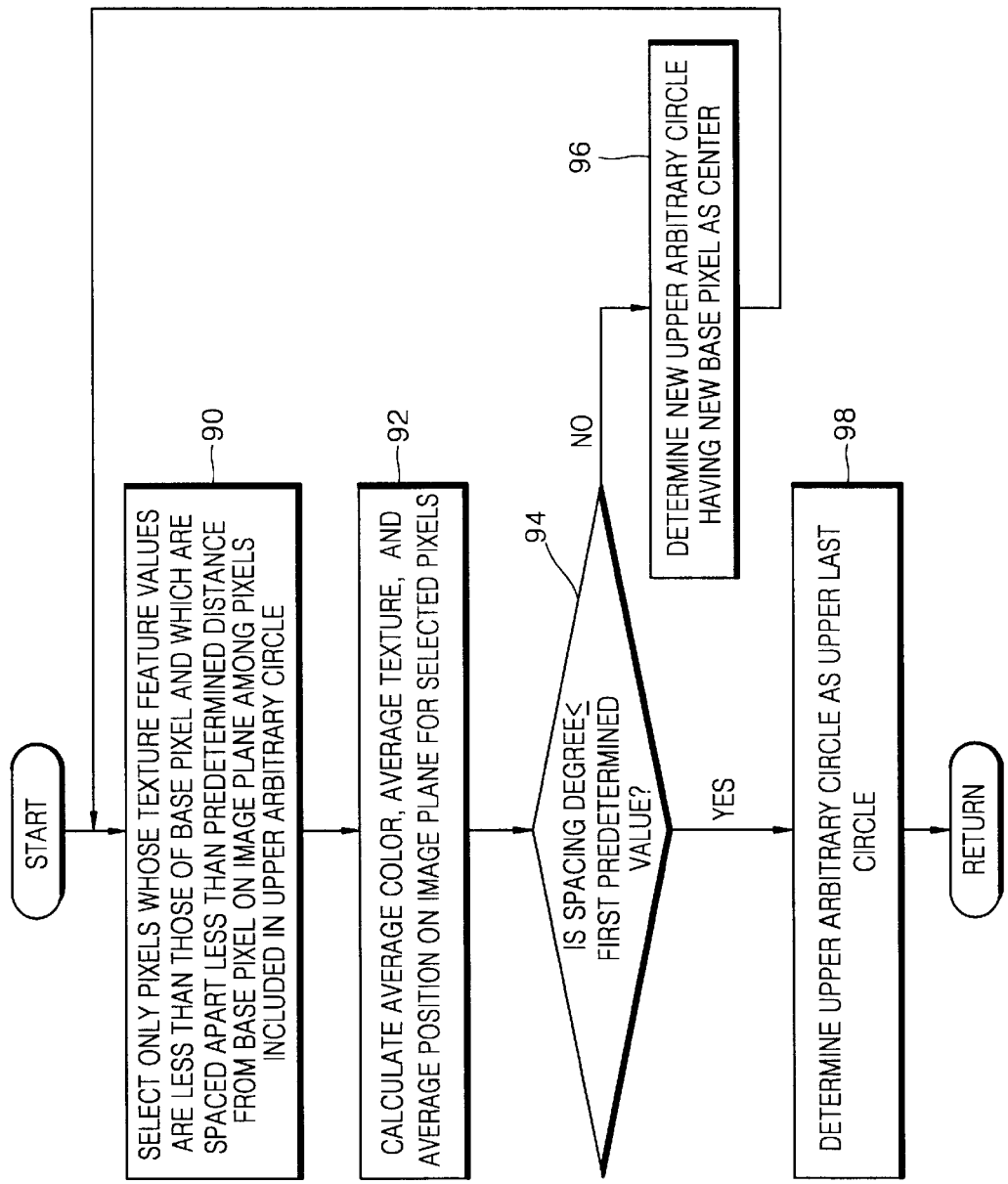

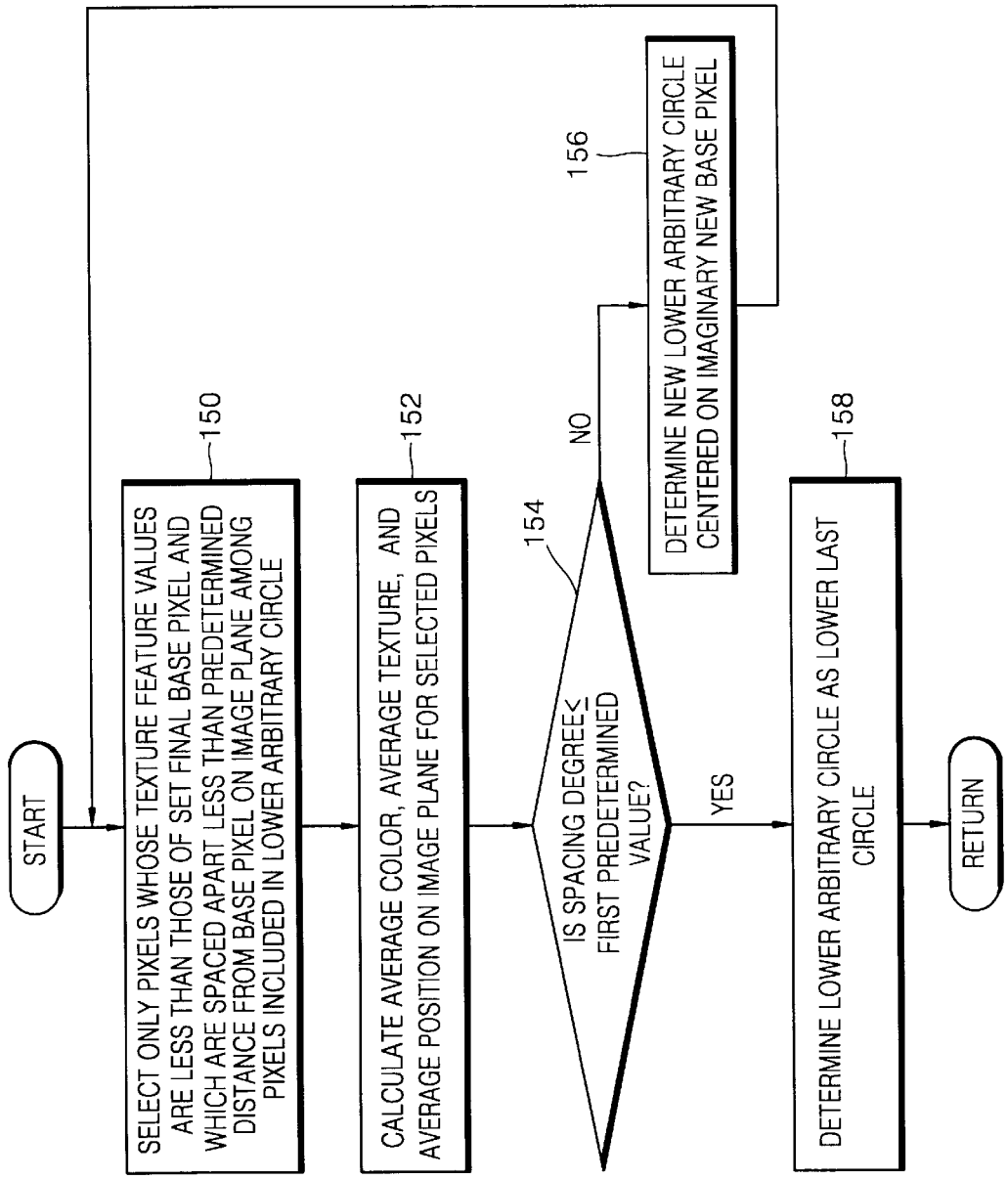

METHOD AND APPARATUS FOR SECTIONING IMAGE INTO PLURALITY OF REGIONS

BACKGROUND OF THE INVENTION

1. Field of the Invention

The present invention relates to image processing, and more particularly, to a method and apparatus for sectioning an image into a plurality of regions.

2. Description of the Related Art

Important factors in forming an image include color, illumination, shape, texture, positions of the objects, mutual geometry of the objects, and the position of the observer relative to an image forming apparatus. Image formation is affected by various devices and environmental conditions. Ideal image segmentation involves effectively distinguishing a meaningful object or a region of the same color from other objects or background in a form similar to what humans can recognize, regardless of the above conditions for image formation. A number of conventional image segmentation techniques for accomplishing this have been suggested.

One of the conventional image segmentation techniques is disclosed in "Distribution Free Decomposition of Multivariate data" [D. Comaniciu and P. Meer, Pattern Analysis and Applications, 1999, Vol, 2, pp 22–30]. The conventional image segmentation technique disclosed therein includes the use of a point-clustering algorithm. The point-clustering algorithm is applied to detect a distribution mode among distributions of color points in a color space, that is, groups of pixels having a color similar to that of a target pixel in an image using color information about the target pixel and obtain a region of the same color by projecting all pixels spaced apart within a predetermined distance onto the image. While this conventional image segmentation technique can quickly distinguish a region of the same color, it has a problem in that an image is excessively segmented in a region containing a texture. Furthermore, another problem encountered by the conventional image segmentation is that it is difficult to properly distinguish a region of a three-dimensional object having shades by insufficiently considering a shading effect.

Another conventional image segmentation approach for considering a shading effect is disclosed in U.S. Pat. No. 5,933,524 entitled "Method for Segmentation of Digital Color Images". This conventional approach includes the use of line-clustering algorithm, in which color histograms are used for segmentation of a color image. The conventional image segmentation disclosed in the above cited reference involves obtaining a color histogram for a specific object and converting the color histogram into a normalized color histogram. The reason is to reduce changes in a color histogram of an object that may occur in a light source under other conditions. Then, thus-obtained color clusters in the color space are described as a parametric function by three models. Here, a parametric function that defines a specific object is used for a measurement of distances between locations of color pixels in the color space thereby effectively distinguishing the specific object in the image. However, this conventional image segmentation approach has limitations in segmenting regions of actual image having various color distribution. Furthermore, the conventional image segmentation has problems in that complicated computations are performed for calculating eigenvalues required for producing a model which is most suitable for representing distributions in a three-dimensional space, and therefore a time taken for segmentation of color image becomes longer.

SUMMARY OF THE INVENTION

To solve the above problems, it is a first objective of the present invention to provide a method of sectioning an image into a plurality of regions, by which image regions having various features can be extracted accurately in a form similar to what humans can perceive.

It is a second objective of the present invention to provide an apparatus for sectioning an image into a plurality of regions that performs the image sectioning method.

In order to achieve the first objective, the present invention provides a method for sectioning an input image into a plurality of regions. The method includes the steps of: (a) converting each pixel of the input image into color coordinates in an arbitrary color space including a luminance (L) axis; (b) partitioning the color space into a plurality of layers along the luminance (L) axis and partitioning each of the plurality of layers into a plurality of bins along color ($\alpha$ and $\beta$) axes; (c) obtaining an upper last circle by a mean-shift analysis, the upper last circle encircling the largest number of pixels having features most similar to those of a base pixel located at a predetermined position within a bin having the largest number of pixels in the color space among bins included in an upper layer; (d) obtaining a lower last circle by the mean-shift analysis, the lower last circle including the largest number of pixels having features most similar to those of a base pixel located at the same position as the center of the upper last circle in a lower layer adjacent to the upper layer; (e) including the upper last and lower last circles in the same cluster if a distance between the centers of the upper last and lower last circles is less than a first threshold value, and if another lower layer adjacent to the lower layer exists, determining the lower layer and the adjacent lower layer as a new upper layer and a new lower layer, respectively, and returning to step (d); (f) if the distance between the centers of the upper last and lower last circles is no less than the first threshold value or if the adjacent lower layer does not exist, partitioning the cluster using a last circle including the smallest number of pixels in the color space used in calculating an average color, an average texture, and an average position among the last circles included in the cluster; and (g) performing steps (c)–(f) on the remaining pixels not included in the upper last or the lower last circle and generating an image graph using clusters obtained for all pixels in the color space.

In order to achieve the second objective, the present invention provides an apparatus for sectioning an input image into a plurality of regions. The apparatus includes: an image preprocessor that smooths the input image a predetermined number of times, enhances edges in the smoothed image, and outputs a preprocessed image; a feature value calculator that calculates color feature values and texture feature values from the image output from the image preprocessor on a pixel-by-pixel basis and outputs the calculated result; a main region section unit that generates an image graph from clusters obtained by using color, texture, and position on an image plane for each pixel in the image output from the image preprocessor and the color and texture feature values output from the feature value calculator and outputs the generated image graph; and an image graph simplification unit that compares a color-texture distance calculated using the color feature values and the texture feature values output from the feature value calculator with a second threshold value, simplifies the image graph according to the comparison result, and outputs a final image graph obtained from the simplified image graph.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

The above objectives and advantages of the present invention will become more apparent by describing in detail preferred embodiments thereof with reference to the attached drawings in which:

FIG. 4 is a flowchart for explaining a mean-shift analysis according to the present invention, by which the step 14 shown in FIG. 1 is performed;

FIG. 6 is a flowchart for explaining a mean-shift analysis according to the present invention, by which the step 16 shown in FIG. 1 is performed;

DETAILED DESCRIPTION OF THE INVENTION

Referring to FIGS. 1(a) and 1(b), a method for sectioning an image into a plurality of regions includes converting each pixel of an input image into color coordinates in an Lαβ color space and partitioning the color space into layers and bins (steps 10 and 12), obtaining an upper last circle and a lower last circle using a mean-shift analysis (steps 14 and 16), and forming and partitioning clusters (steps 18–26), and generating and simplifying an image graph using clusters (steps 28–30).

Figure 1:
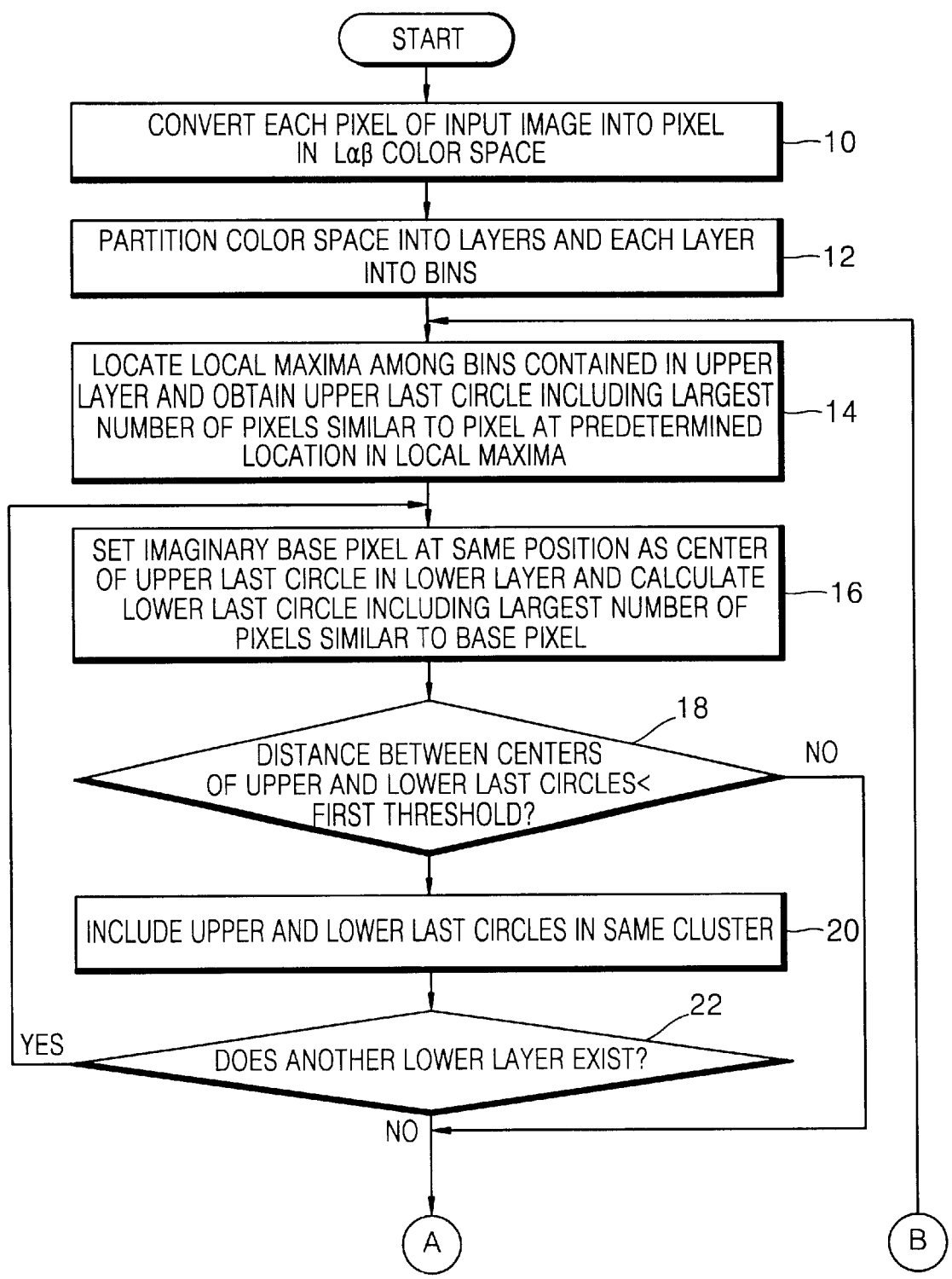
FIGS. 1(a) and 1(b) is a flowchart for explaining a method for sectioning an image into a plurality of regions according to the present invention.
Figure 1:
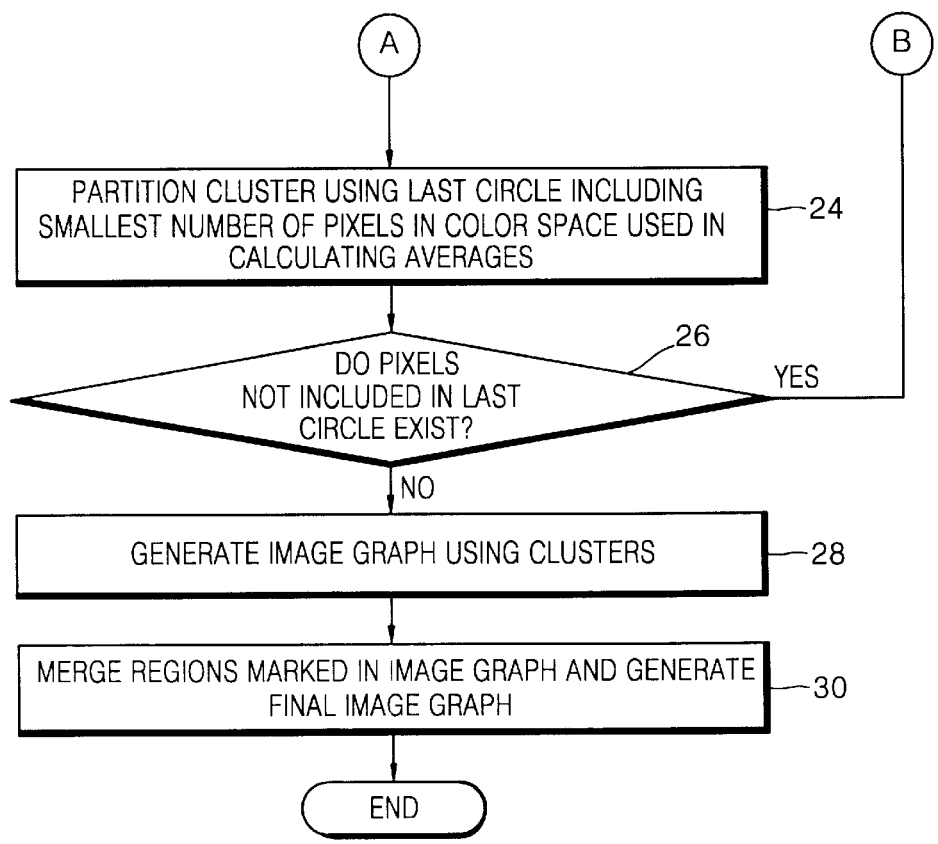
Figure 2:
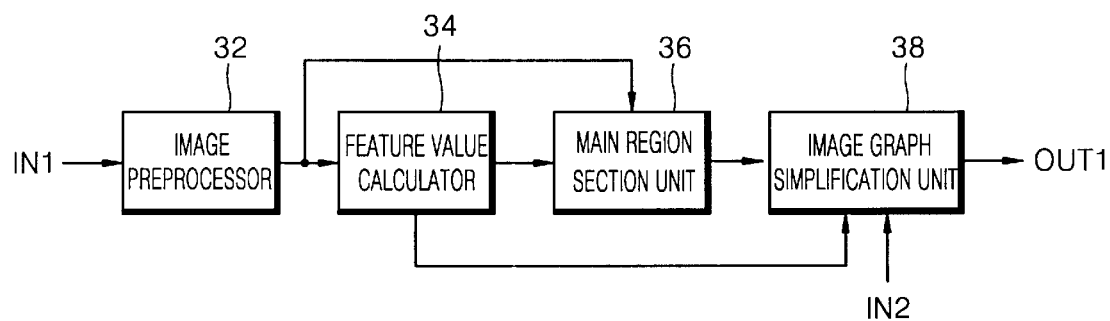
FIG. 2 is block diagram of an apparatus for sectioning an image into a plurality of regions according to a preferred embodiment of the present invention.

Referring to FIG. 2, an apparatus for performing the method for sectioning an image into a plurality of regions shown in FIG. 1 includes an image preprocessor 32, a feature value calculator 34, a main region section unit 36, and an image graph simplification unit 38.

Referring to FIGS. 1 and 2, the main region section unit 36 converts each pixel of the input image into color coordinates in the Lαβ color space (step 10). In this case, L is luminance, and α and β are color components, all of which are defined by Equation (1):

$$L = \frac{r+g+b}{3}$$

$$\alpha = (r-g) \cdot 2$$

$$\beta = (r+g-2b)$$

(1)

where r, g and b denote color values of each pixel.

In step 10, the main region section unit 36 may input an image through an input terminal IN1 or from the image preprocessor 32 as shown in FIG. 2. For example, the image preprocessor 32 repeatedly smooths the image input through the input terminal IN1 a predetermined number of times and outputs an image preprocessed by enhancing edges in the smoothed image to the feature value calculator 34 and to the main region section unit 36. As a consequence, the main region section unit 36 can convert the smoothed image output from the image preprocessor 32 or each pixel of the image input through the input terminal IN1 into color coordinates in the Lαβ color space.

Smoothing of an input image performed by the image preprocessor 32 will now be described in detail.

In general, an input image such as that captured through a camera sensor or a video image signal is composed of two portions: noise and a meaningful signal. Here, each component of an image includes different kinds of information. This method for statistically dividing two portions allows the input image to be broken into various different components. For example, the image preprocessor 32 performs an edge-preserving image smoothing process in such a way as to filter out noise by smoothing the input image and to preserve edges of an object by decomposing the smoothed image into a portion having an outstanding edge and a portion having no outstanding edge. This edge-preserving image smoothing is disclosed in "Two Tasks in Image Enhancement Technology" by P. A. Chochia, *Optical Memory and Neural Networks*, 1998, and summarized as follows.

If a set {x} of pixels in a window of a predetermined size is defined by Equation (2), windows of different sizes are applied to smooth pixels excluding those having outstanding luminance values among pixels in each window.

$$\{x\} = x_1 \leq x_2, \ldots, \leq x_n (x_i \in W_{mn})$$

(2)

Luminance value $1^q_{mn}$ obtained after smoothing of an input image is repeated q times is calculated in a window $W^q_{mn}$ using the previously obtained luminance value $1^{q-1}_{mn}$, as expressed by Equation (3):

$$1^q_{mn} = \frac{\sum_{x \in W^q_{mn}} xw(x - 1^{q-1}_{mn})}{\sum_{x \in W^q_{mn}} w(x - 1^{q-1}_{mn})}$$

(3)

Here, w(x') is a predetermined weight function. If x' is between −σ and +σw(x')=1, and if not, w(x')=0. The luminance value $1^{q-1}_{mn}$ refers to a central value of the weight function w(x') in a previous window $W^{q-1}_{mn}$. $x_{mn}$ is used in place of $l^{q-1}_{mn}$ in initial smoothing of the input image. In this case, a luminance value $s'_{mn}$ of a pixel which has been smoothed Q times is represented by $l^Q_{mn}$. That is, the luminance value $s'_{mn}$ refers to a result of smoothing a pixel with Q windows. It is experimentally shown that smoothing is preferably performed twice. A square window having sides of length 3–5 pixels was used for first smoothing, and a square window having sides of length 10–40 pixels was used for second smoothing. The use of these windows has proven effective in extracting smoothed components from an image which contains a large amount of noise, and in this case, an acceptable mean square error of a computed result value was within 0.5%.

Following step 10, the Lαβ color space is partitioned into layers along an L-axis, and each layer is partitioned again into bins along α- and β-axes (step 12). In this case, the positions X and Y of pixels contained in each layer on an image plane are stored.

Figure 3:
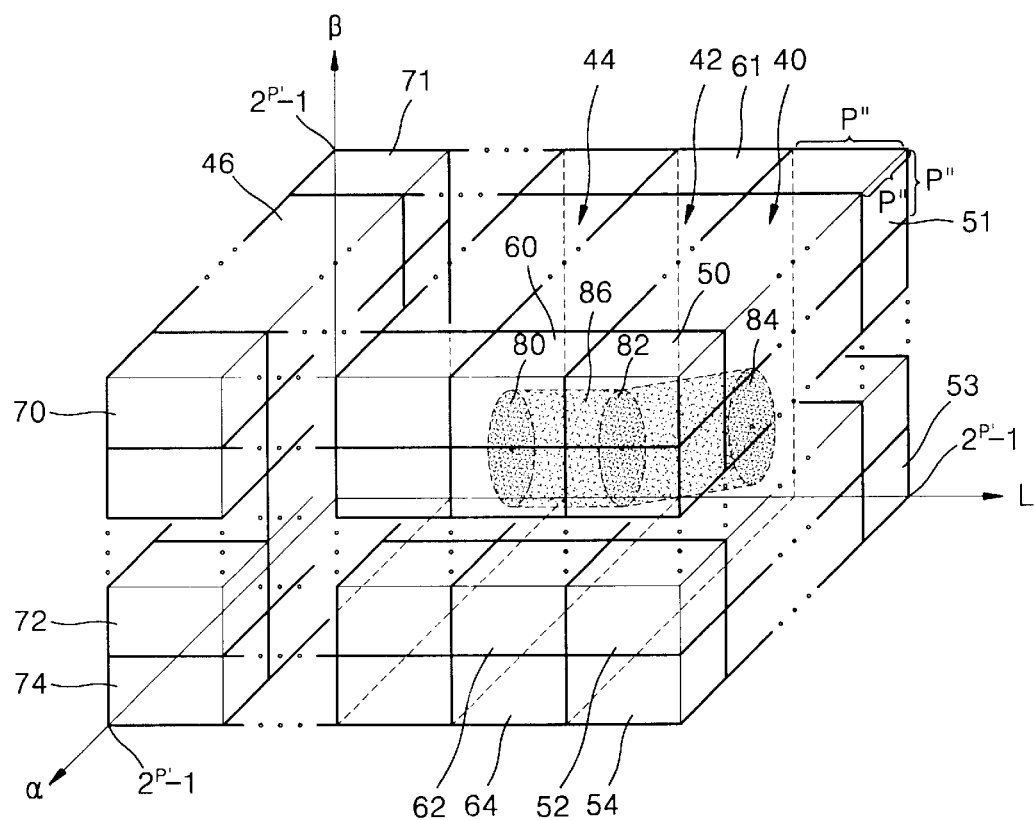
FIG. 3 shows an Lαβ color space for explaining layers and bins.

The layers and bins formed in step 12 will now be described with reference to FIG. 3. Referring to FIG. 3, which shows the Lαβ color space for layers and bins, the Lαβ color space is partitioned into a plurality of layers 40, 42, 44, . . . , and 46, and each of the plurality of layers 40, 42, 44, . . . , and 46 is partitioned into a plurality of bins. For example, the layer 40 is composed of a plurality of bins 50, 51, 52, 53, 54, . . . , the layer 42 is composed of a plurality of bins 60, 61, 62, 64, . . . , and the layer 46 is composed of a plurality of bins 70, 71, 72, 74, . . . . Each axis has a range from 0 to $2^{p'}-1$, and each bin is a cube whose length, width, and height are p".

First, it is assumed that the L-axis defines 2 to the 8th power (256) different brightness (p'=8), the α- and β-axes define 2 to the 8th power (256) different colors (p'=8), and p"=4. It is further defined that, of two layers shown in FIG. 3, one layer having lower brightness is a "lower layer" and the other layer having higher brightness is an "upper layer". That is, the layer 40 is an upper layer to the layer 42, and the layer 42 is a lower layer to the layer 40. Similarly, the layer 42 is an upper layer to the layer 44, and the layer 44 is a lower layer to the layer 42.

Under the above assumption, four brightness values on the L-axis in the color space with L, α, and β coordinate axes are assigned for each layer, which partitions the color space into 64 layers 40, 42, 44, . . . , and 46. That is, brightness values 255, 254, 253, and 252 are assigned to the layer 40. Similarly, the color space is partitioned along the α- and β-axes such that each of the layers 40, 42, 44, . . . , and 46 has 64×64 bins.

Following step 12, an upper last circle, in which pixels having features most similar to that of an initial pixel located at a predetermined position within a local maxima among the bins 50, 51, 52, 53, 54, . . . contained in the first upper layer 40 shown in FIG. 3 are most densely arrayed, is obtained by mean-shift analysis (step 14). Here, the local maxima refers to a bin including the largest number of pixels among bins included in a particular layer.

A preferred embodiment of a mean-shift analysis used when the main region section unit 36 performs step 14 will now be described with reference to FIGS. 4 and 5. Referring to FIG. 4, a mean-shift analysis method according to the present invention includes calculating an average color, an average texture, and an average position X and Y on an image plane for pixels selected among pixels contained in an upper arbitrary circle, comparing the average color, the average texture and the average position for the selected pixels with those for a base pixel, and determining whether the averages of the selected pixels converge (steps 90–96). Steps 90–96 are repeated until a converged upper arbitrary circle is obtained. The method further includes determining the converged upper arbitrary circle as an upper last circle (step 98).

Figure 5A:
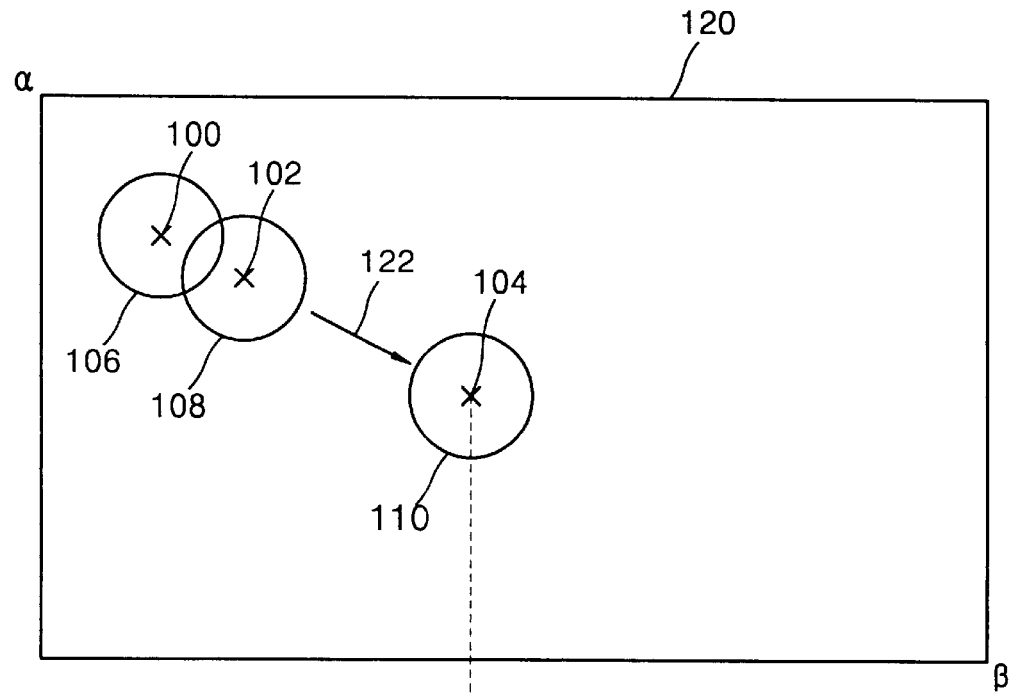
FIGS. 5(a) and (b) shows a mean-shift analysis.
Figure 5B:
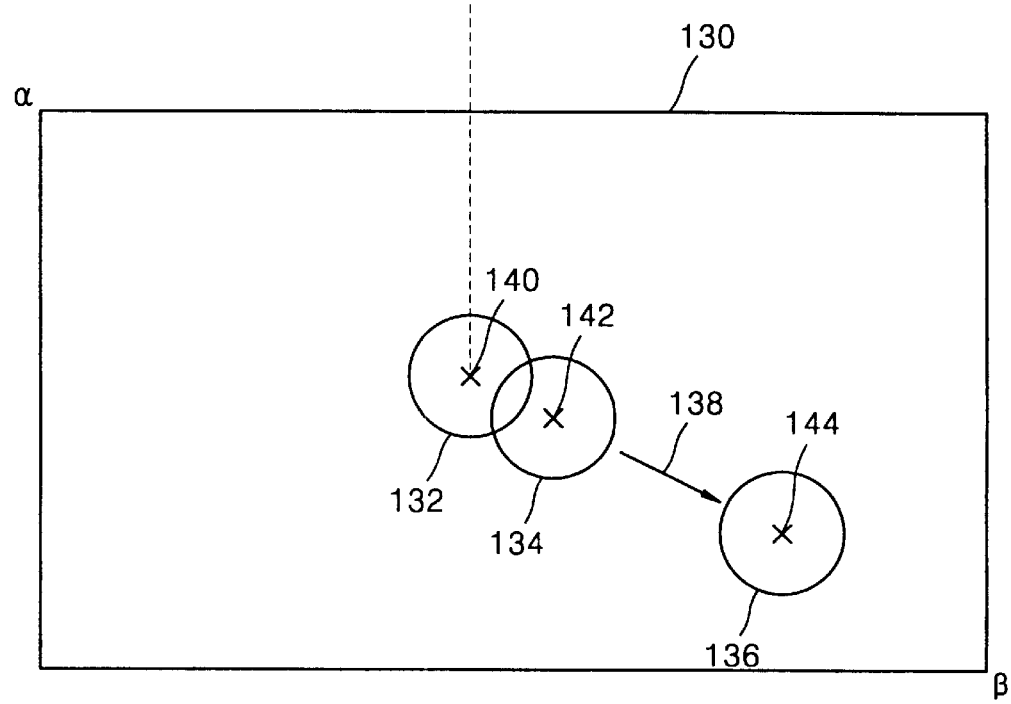

Referring to FIGS. 5(a) and (b) which explain a mean-shift analysis method, an upper layer 120 in FIG. 5(a) consists of one or more upper arbitrary circles 106, 108, . . . , and 110, while a lower layer 130 in FIG. 5(b) consists of one or more lower arbitrary circles 132, 134, . . . , and 136. Here, the abscissa of each layer 120 or 130 is a β axis and the ordinate is an α axis, which are same as the α- and β-axes in the color space shown in FIG. 3. In order to explain the mean-shift analysis of the present invention, the layers 120 and 130 are shown as each having a plurality of arbitrary circles 106, 108, 110, 132, 134, and 136. However, each layer 120 or 130 may have only a single arbitrary circle.

First, among pixels included in the first upper arbitrary circle 106 having a center at a predetermined location 100 in the upper layer 120 having the highest brightness as shown in FIG. 5(a) and a radius of $\sigma_C$, only pixels whose texture feature values are less than a texture feature value of a pixel located at the center 100 of the first upper arbitrary circle 106 (hereinafter called "base pixel") by a texture distance $\sigma_\theta$ and which are spaced apart less than a predetermined distance $\sigma_G$ from the position of the base pixel on an image plane, are selected (step 90). The texture feature values of each pixel required for performing step 90 are output from the feature value calculator 34 of FIG. 2.

The operation of the feature value calculator 34 of FIG. 2 will now be described. The feature value calculator 34 computes color feature values and texture feature values on a pixel-by-pixel basis from the preprocessed image output from the image preprocessor 32, and outputs the computed color and texture feature values to the main region section unit 36 and the image graph simplification unit 38.

With reference to the color feature values computed in the feature value calculator 34, first, a color feature space and a texture feature space are used together to provide a basis for a general feature space. In this case, color feature values of each pixel in an image can be specified by defining the color and texture feature spaces. The color feature values, i.e., brightness (B), hue (H), and saturation (S) of each pixel, are defined by Equations (4):

$$B = \sqrt{\frac{r^2 + g^2 + b^2}{3}} \quad (4)$$

$$H = \frac{120° \ (b - u)}{g + b - 2u} + 60°, \text{ if } r = u$$

$$\frac{120° \ (r - u)}{b + r - 2u} + 180°, \text{ if } g = u$$

$$\frac{120° \ (g - u)}{r + g - 2u} + 300°, \text{ if } b = u$$

$$S = 1 - \frac{u}{r + g + b}$$

where u=min(r, g, b)

Next, with reference to the texture feature values calculated in the feature value calculator 34, each of texture feature values of multiple scales and multiple orientations used for forming a texture feature space is obtained by calculating a local variation v and a local oscillation f for each pixel in multiple directions and combining them. This texture image analysis is called a Gray Level Difference Method. The Gray Level Difference Method is disclosed in "Some Basic Texture Analysis Techniques" (E. J. Carton, J.

S. Weszka and A. Rosenfeld, TR-288, Univ of Maryland, 1974) and "Texture Analysis Anno" (L. Van Gool, P. Dewaele and A. Oosterlinck, CVGIP, 1985). The brightness (B) of an image defined by Equation (4) is used in extracting the texture feature values.

With regard to local variation v, pixels having length 2L' having a pixel (m, n) as a center exist in an image, and the pixels are turned around the pixel (m,n) at angle $a'_k = k\pi/K$, m and n are the same as the spatial positions X and Y of a pixel on an image plane, and k=0, 1, . . . , K−1. Assuming that $I_i$ represents the brightness (B) of a pixel among pixels uniformly arrayed in this way, where −L'≦i≦L', an upward weight variation $v^+$ and a downward weight variation $v^-$ are expressed by Equations (5):

$$v^+ = \sum_{i=-L}^{L-1} w_i d_i, \text{ if } di > 0$$

$$v^- = \sum_{i=-L}^{L-1} w_i(-d_i), \text{ if } di < 0 \quad (5)$$

where $d_i$ denotes a gradient $I_{i+1} - I_i$ between brightnesses of adjacent pixels in the pixel array and $w_i$ is a cosine weight function $A \cos(i\pi/(2L'+1))$. A coefficient A in the cosine weight function $w_i$ is used for establishing $$\sum_{i=-L}^{L} w_i = 1.$$

In this case, local variation $v_k$ is designated as the smaller of the upward weight variation $v^+$ and the downward weight variation v as expressed by Equation (6):

$$v_k = \min(v_k^+, v_k^-) \quad (6)$$

A local oscillation f is defined by the number of $d_i$ ($d_i$ denotes the magnitude of oscillation), the magnitudes of which exceed a predetermined threshold value at the same time that the signs are changed among $d_i$ calculated along a length 2L' of the array, where −L'≦i≦L'. In this case, local variation $v_k$ and local oscillation $f_k$ for each pixel are multiplied to obtain texture feature values $\hat{t}_k$ (=$v_k f_k$) for a corresponding pixel. Furthermore, to make the calculated texture feature values more equal, Equation (7) is used:

$$t_k = \tanh\left[\alpha \sum_h \hat{t}_k(h)\right] \quad (7)$$

As is evident from Equation (7), the texture feature values $t_k$ are smoothed as an average of a window having a size of h×1, and high and low texture feature values are made lower and higher, respectively, due to modification using a hyperbolic tangent function 'tan h'. In this case, when the size of an image is reduced Z times (by a half every time) at different frequencies, the texture feature values $t_k$ for each pixel defined by Equation (7) can be expressed by Equation (8):

$$t_k^Z = \tanh\left[\alpha \sum_h t_k^Z(h)\right] \quad (8)$$

As is evident from Equation (8), KZ texture feature values $t_k^Z$ are produced for each pixel.

Turning to FIG. 4, after step 90, the main region section unit 36 calculates an average color, an average texture, and an average position on an image plane for the selected pixels (step 92). Here, the average color means an average of color components α and β for the selected pixels in the layer on the given L and is called average Lαβ. The average texture means average of textures for the selected pixels, and the average position means an average of positions for the selected pixels. Then, when each of the calculated averages is compared with each average of the base pixel 100 which is the center of the first upper arbitrary circle 106, it is determined whether a spacing degree is less than or equal to a first predetermined value (step 94). Here, in step 94, the spacing degree is calculated from differences between the averages obtained in step 92 and the averages of the base pixel 100 as will be described below. If the calculated spacing degree is greater than the first predetermined value, a pixel, the center of which is a position 102 corresponding to the average color obtained in step 92, is designated as an imaginary base pixel, and texture feature values and a position on an image plane for the imaginary base pixel are designated as the average texture and the average position calculated in step 92. Then, a new upper arbitrary circle, i.e., the second upper arbitrary circle 108 having the center of the new base pixel 102 at the position 102, is determined, and the process returns to step 90 (step 96).

Steps 90–96 are performed in the direction indicated by an arrow 122 shown in FIG. 5(a) until the spacing degree is less than or equal to the first predetermined value, that is, an average color, an average texture, and an average position on an image plane for selected pixels in an upper arbitrary circle converge on feature values (color, texture, and position) of a base pixel of the upper arbitrary circle. That is, as shown in FIG. 5(a), if the spacing degree obtained from the differences between the averages (color, texture, and position) for an upper arbitrary circle 110 and the features (color, texture and position) of a base pixel 104 at the center of the upper arbitrary circle 110, is less than or equal to the first predetermined value, the upper arbitrary circle 110 is determined as an upper last circle 84 shown in FIG. 3 (step 98). Here, the upper last circle 84 or 110 includes the largest number of pixels having feature values most similar to those of the imaginary base pixel 104.

Turning to FIG. 1, after step 14, an imaginary base pixel having the same features (texture and position) as the base pixel of the upper last circle 84 is set at the same position α and β as the center of the upper last circle 84 in the lower layer 42 successively adjacent to the upper layer 40, and a lower last circle 82 including the largest number of pixels having feature values most similar to those of the imaginary base pixel is obtained by the mean-shift analysis (step 16).

A mean-shift analysis method according to a preferred embodiment of the present invention used when the main region section unit 36 performs step 16 will now be described with reference to FIG. 6.

Referring to FIG. 6, the mean-shift analysis method according to the present invention used in performing step 16 shown in FIG. 1 includes obtaining an average color, an average texture, and an average position X and Y on an image plane for pixels, which are selected among pixels contained in a lower arbitrary circle until a converged lower arbitrary circle is obtained (steps 150–156), and determining the converged lower arbitrary circle as a lower last circle (step 158).

Referring to FIGS. 5(a) and (b), among pixels included in the first lower arbitrary circle 132, having its center at the same location 140 in the lower layer 130 as the center 104 of the upper last circle 110 and having a diameter of $\sigma_c$, only pixels whose texture feature values are less than those of the set base pixel 140 by $\sigma_\theta$ and which are spaced apart less than a predetermined distance $\sigma_G$ from the position of the base pixel 140 on an image plane, are selected (step 150). The texture feature values used in performing step 150 are calculated by the feature value calculator 34 as described above.

In a preferred embodiment of the present invention, pixels are selected among pixels in an arbitrary circle in steps 90 and 150 in the following manner. First, using differences $\Delta X$ and $\Delta Y$ between positions on an image plane, differences $\Delta \alpha$ and $\Delta \beta$ between color components, and differences $\Delta \theta$ between texture feature values of any pixel located in an upper (or lower) arbitrary circle and a central pixel located at the center of that upper (or lower) arbitrary circle, a distance $\Delta'$ between any pixel and the central pixel is obtained according to Equation (9):

$$\Delta' = \frac{\Delta X^2 + \Delta Y^2}{\sigma_G^2} + \frac{\Delta \alpha^2 + \Delta \beta^2}{\sigma_C^2} + \sum_{i'=1}^{K} \frac{\sum_{j'=1}^{Z} \Delta \theta_{i'j'}^2}{\sigma_{\theta_{i'}}^2} \quad (9)$$

where $\theta$ denotes an arrangement $\theta[KZ]$ of KZ texture feature values for each pixel obtained from Equation (8) as a texture response, and $\sigma_{\theta_i}$ denotes a texture distance at an i-th size among K different sizes.

If the distance $\Delta'$ obtained as defined by Equation (9) is less than a second predetermined value, for example, '1', the pixel is selected as a pixel considered for any average value. If not, the pixel is not selected.

After step 150, an average color, i.e., an average L$\alpha\beta$, an average texture, and an average position on an image plane are calculated for pixels selected among pixels in the first lower arbitrary circle 132 (step 152). Here, each average is calculated in the same way as described for step 92. After step 152, when each of the calculated averages is compared with each feature value of the base pixel at the center 140 of the first lower arbitrary circle 132, it is determined whether or not the spacing degree is greater than a first predetermined value (step 154). Here, the spacing degree used for step 94 or 154 is calculated by using Equation (9). That is, in step 94 or 154, in order to obtain the spacing degree $\Delta'$, differences between average position obtained in step 92 or 152 for any upper (or lower) arbitrary circle and position on an image plane of a central pixel in that upper (or lower) arbitrary circle are substituted for $\Delta X$ and $\Delta Y$, differences between average colors and color components of the central pixel are substituted for $\Delta \alpha$ and $\Delta \beta$, and the difference between average texture and a texture feature value of the central pixel is substituted for $\Delta \theta$ in Equation (9). If the calculated spacing degree is greater than the first predetermined value, a pixel at a position 142 corresponding to the average color obtained in step 152 is designated as an imaginary base pixel, and a texture feature value and a position on an image plane for the base pixel are designated as the average texture and the average position calculated in step 152. Then, a new lower arbitrary circle, i.e., the second lower arbitrary circle 134 having the new base pixel at its center 142, is determined, and the process returns to step 150 (step 156).

Steps 150–156 are performed in the direction indicated by an arrow 138 shown in FIG. 5(b) until the spacing degree is less than or equal to the first predetermined value, that is, an average color, an average texture, and an average position on an image plane for selected pixels in a lower arbitrary circle converge on feature values (color, texture, and position) of a base pixel of the upper arbitrary circle. That is, as shown in FIG. 5(b), if the spacing degree obtained from the differences between the averages (color, texture, and position) for a lower arbitrary circle 136 and the features (color, texture and position) of a base pixel at the center 144 of the lower arbitrary circle 136 is less than or equal to the first predetermined value, the lower arbitrary circle 136 is determined as a lower last circle 82 shown in FIG. 3 (step 158). Here, the upper last circle 82 or 136 includes the largest number of pixels having feature values most similar to those of the base pixel 144.

As described above, since a layer having lower brightness and a layer having higher brightness are defined as a 'lower layer' and an 'upper layer', respectively, the last circle for the layer having lower brightness is obtained after the last circle for the layer having higher brightness is obtained in steps 14 and 16. Conversely, if the layer having higher brightness and the layer having lower brightness are defined as a "lower layer" and an "upper layer", respectively, a last circle for the layer having higher brightness is obtained after a last circle for the layer having lower brightness is obtained in steps 14 and 16.

Turning to FIG. 1, after step 16, an upper last circle determined in an upper layer is selectively connected to a lower last circle determined in a lower layer (step 18) to cluster pixels having similar saturations and gradually varying brightnesses due to a shading effect (step 20). For example, after step 16, it is determined whether a distance $[(\alpha_2-\alpha_1)^2+(\beta_2-\beta_1)^2]^{1/2}$ between the center $(\alpha_1, \beta_1)$ 104 of the upper last circle 110 and the center $(\alpha_2, \beta_2)$ of the lower last circle 136 is less than a first threshold value th1 (step 18). If the distance is less than the first threshold value th1, the upper last and lower last circles 110 and 136 (or 84 and 82) are included in the same cluster 86 (step 20).

Figure 7A:
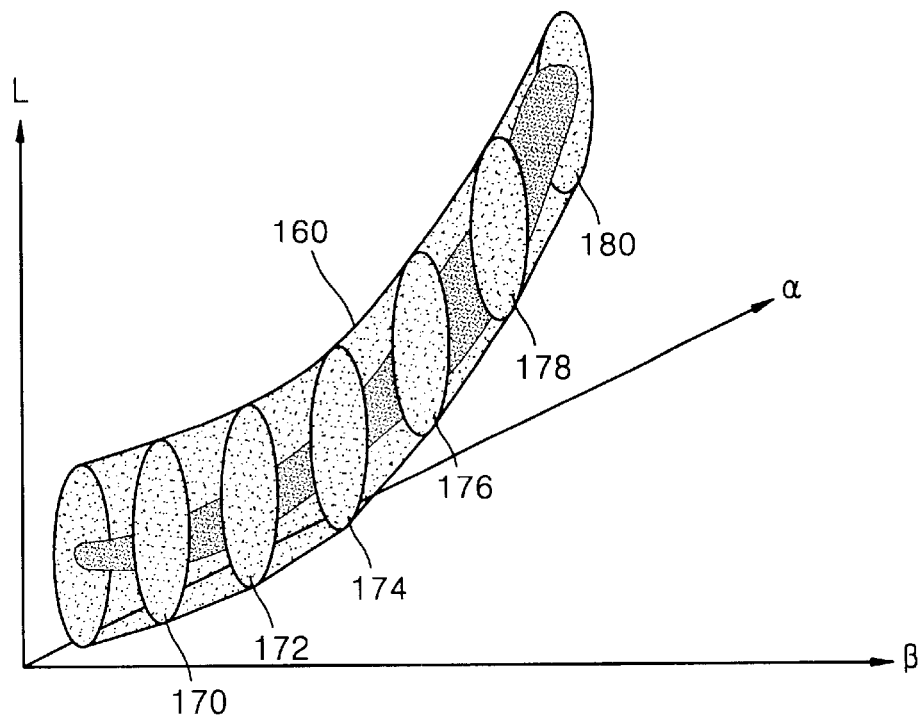
FIG. 7A shows an example of a cluster formed by the method and apparatus for sectioning an image into a plurality of regions according to the present invention and FIG. 7B is a graph for explaining a local minimum.
Figure 7B:
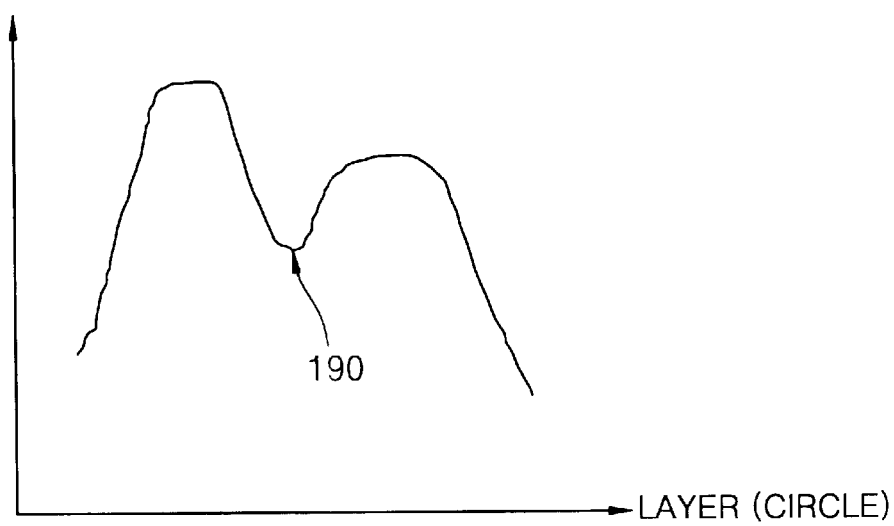

FIG. 7A shows an example of a cluster 160 formed by the method and apparatus for sectioning an image into a plurality of regions shown in FIGS. 1 and 2, in which the cluster 160 includes a plurality of last circles 170, 172, 174, 176, 178, and 180. FIG. 7B is a graph for explaining a local minimum, in which the number of pixels is plotted against the layer.

After step 20, it is determined whether another lower layer successively adjacent to the lower layer exists (step 22). That is, it is determined whether a last circle is obtained for the last layer 46. If an adjacent lower layer exists, that is, unless a last circle is obtained for the last layer 46, the process returns to step 16. In this case, steps 16–22 are performed on the lower layer, which is a new upper layer, and the adjacent lower layer, which is a new lower layer. For example, in a case where steps 16–22 are performed for obtaining a last circle for another lower layer 44, the previous lower layer 42 is a new upper layer and the lower layer 44 is a new lower layer.

However, if the distance between the center $(\alpha_1, \beta_1)$ 104 of the upper last circle 110 and the center $(\alpha_2, \beta_2)$ of the lower last circle 136 is no less than the first threshold value th1, or if an adjacent lower layer does not exist, the cluster 160 is partitioned using a last circle including the smallest number of pixels in a color space used in calculating an L$\alpha\beta$ average among the last circles 170, 172, 174, 176, 178, and 180 included in the cluster 160 shown in FIG. 7A (step 24). That is, if the distance is no less than the first threshold value th1, there is no adjacent lower layer or one cluster ceases to be formed and then step 24 is performed. Step 24 is performed to minimize an error caused by including various objects having similar chromatic characteristics but different brightnesses in the same cluster. For example, if the last circles 170, 172, 174, 176, 178, and 180 use 5, 15, 23, 17, 34, and 14 pixels, respectively, in order to calculate the $L\alpha\beta$ average, the cluster 160 shown in FIG. 7A is partitioned using the last circle 176 including only 17 pixels. Here, the circle 176 corresponds to a local minimum mode 190 as shown in FIG. 7B.

After step 24, it is determined whether pixels not included in any last circle 84, 82 . . . , or 80 exist in any layer 40, 42, 44, . . . , and 46 (step 26). If pixels not included in any last circle 84, 82 . . . , or 80 exist in each of the layers 40, 42, 44, . . . , and 46, the process returns to step 14 in order to perform steps 14–24 on the remaining pixels not included in any last circle 84, 82 . . . , or 80. However, if such pixels do not exist, an image graph is generated from a fundamental region division map obtained by using clusters available for all pixels in the color space (step 28).

Figure 8:
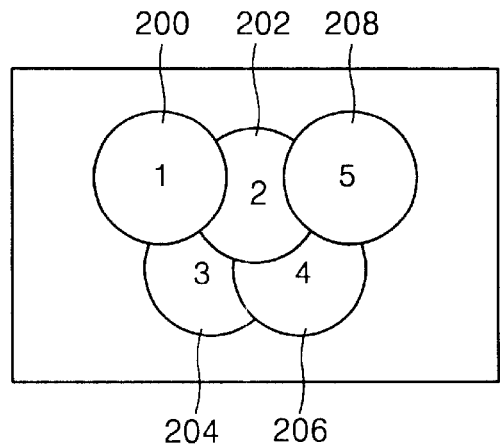
FIG. 8 is a exemplary diagram for explaining a fundamental region division map.
Figure 9:
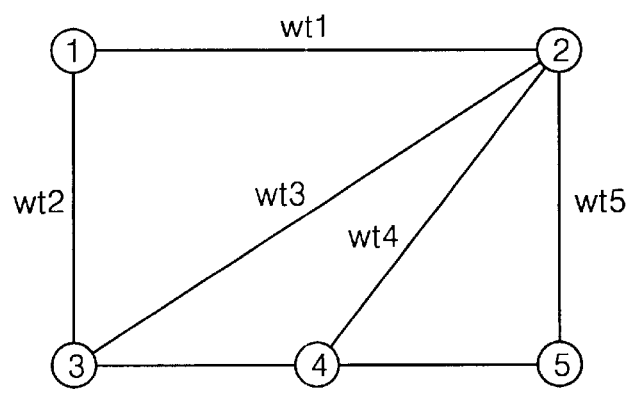
FIG. 9 is an exemplary diagram of an image graph generated from the fundamental region division map of FIG. 8.

FIG. 8 is an example of a fundamental region division map consisting of five regions 200, 202, 204, 206, and 208 which are assigned region numbers 1, 2, 3, 4, and 5, respectively. FIG. 9 is an example of an image graph generated from the fundamental region division map shown in FIG. 8. As is evident from FIG. 9, adjacent regions on the fundamental region division map are connected to one another. Here, ①, ②, ③, ④, and ⑤ denote the five regions 200, 202, 204, 206, and 208 shown in FIG. 8, respectively.

The main region section unit 36 generates the fundamental region division map shown in FIG. 8 from the clusters obtained by performing steps 10–26, and generates the image graph of FIG. 9 using the fundamental region division map (step 28). In this case, the main region section unit 36 stores information about each region such as the number of pixels, an average color, and texture feature values. In particular, the average color is obtained averaging brightnesses, hues, and saturations (BHS) of pixels calculated by the feature value calculator 34. Here, the image graph of FIG. 9 provides information about what regions are adjacent to each other in the fundamental region division map of FIG. 8 and information about weight values wt1, wt2, wt3, wt4, and wt5 for lengths of edges between adjacent regions.

After step 28, the image graph simplification unit 38 of FIG. 2 compares the color-texture distance input through the input terminal IN2 with a second threshold value th2, merges regions marked in the image graph output from the main region section unit 36 according to the comparison result to generate a final image graph, and outputs the generated final image graph through the output terminal OUT1 (step 30). Step 30 will now be described in detail.

Figure 10:
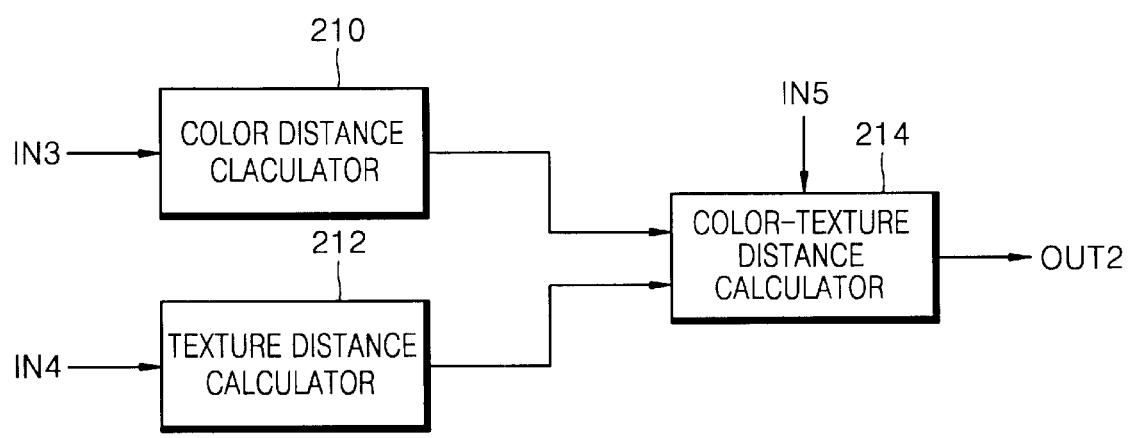
FIG. 10 is a block diagram of an apparatus for measuring a color-texture distance used in the step 30 shown in FIG. 1.

FIG. 10 is a block diagram of an apparatus for measuring a color-texture distance used in performing step 30 shown in FIG. 1. Referring to FIG. 10, the apparatus includes a color distance calculator 210, a texture distance calculator 212, and a color-texture distance generator 214. More specifically, the color distance calculator 210 inputs color feature values of each of two points x and y such as brightness (B), saturation (S), and hue (H) through an input terminal IN3 in a color feature space composed of color feature values of pixels in an image. Then, the color distance calculator 210 assigns different degrees of importance to a difference between input brightnesses, a difference between input saturations, and a difference between input hues, adds the brightness difference, the saturation difference, and the hue difference in proportion with the assigned degrees of importance, and outputs the added result to the color-texture distance generator 214 as a color distance between the two points x and y. In this case, the above degree of importance is determined in a color feature space composed of BHS using the following three standard conditions. First, hue (H) is a more important factor in determining importance than brightness (B) and saturation (S). Second, if brightness (B) approaches an absolute value '0', the color of an image is black without regard to hues (H) or saturation (S). Third, if saturation (S) approaches an absolute value '0', that is, the color of an image is gray, hue (H) has an arbitrary value.

The color distance calculator 210 assigns degrees of importance determined on the basis of the above-mentioned standard conditions to the brightness difference, the saturation difference, and the hue difference to obtain a color difference $[D_{BHS1}(x,y)]$, expressed by Equation (10):

$$D_{BHS1}(x,y)=W_B|B(x)-B(y)|+F_H[\min(S(x),S(y))](a\bar{B}+b)\bar{S}|H(x)-H(y)|+F_S(\bar{S})\bar{B}|S(x)-S(y)| \quad (10)$$

Here, B(o), H(o), and S(o) denote color feature values, i.e., brightness, hue, saturation of point o (o refers to x or y), respectively, and $\bar{B}$ and $\bar{S}$ denote the average of B(x) and B(y) and the average of S(x) and S(y), respectively. $W_B$, a and b are constants, and $F_S(j)$ and $F_H(j)$ denote linear correction functions for saturation and hue, respectively. In this case, the linear correction function $F_S(j)$ or $F_H(j)$ is employed to suppress the difference between hue and saturation under conditions of low brightness and low saturation. For this purpose, the linear correction function $F_S(j)$ or $F_H(j)$ is j if j is less than 1, and 1 if j is 1 or greater.

As is evident from Equation (10), the brightness difference [B(x)–B(y)], the hue difference [H(x)–H(y)], and the saturation difference [S(x)–S(y)] have different coefficients which are determined according to the degrees of importance as described above.

In this case, the color distance calculator 210 may obtain a color distance $[D_{BHS2}^2(x,y)]$ by assigning degrees of importance determined based on the above-mentioned standard conditions to the brightness difference, the saturation difference, and the hue difference expressed by Equation (11) in place of Equation (10):

$$D_{BHS2}^2(x,y)=W_B[B(x)-B(y)]^2+W_HF_B[B(x),B(y)]F_S[S(x),S(y)][H(x)-H(y)]^2+W_SF_B[B(x),B(y)][S(x)-S(y)]^2 \quad (11)$$

where $W_H$ and $W_S$ are constants, and $F_S(\bullet,\bullet)$ and $F_B(\bullet,\bullet)$ denote nonlinear correction functions for saturation and brightness, respectively.

As is evident from Equation (11), the square of brightness difference $[B(x)-B(y)]^2$, the square of hue difference $[H(x)-H(y)]^2$, and the square of saturation difference $[S(x)-S(y)]^2$ have different coefficients which are determined according to degrees of importance as described above.

If the color distance calculator 210 calculates a color distance using Equation (10) or (11), image segmentation can be stably made in a regular way without being affected by the change in brightness. Furthermore, in order to enhance discrimination of low brightness region, the color distance calculator 210 may compute a color distance $[D_{BHS3}(x,y)]$ as defined by Equation (12):

$$D_{BHS3}(x,y)=D_{BHS}*\left\{1.0+\frac{\alpha'}{\min(B(x),B(y))/256+\beta'}-\frac{\alpha}{1.0+\beta'}\right\} \quad (12)$$

where $D_{BHS}$ denotes the color distance $[D_{BHS1}(x,y)]$ or $[D_{BHS2}^2(x,y)]$ expressed by Equation (10) or (11).

Meanwhile, the texture distance calculator 212 shown in FIG. 10 inputs from the feature value calculator 34 texture feature values of two points x and y through an input terminal IN4 in a texture feature space composed of texture feature values for pixels. Then, the texture distance calculator 212 detects a difference between the input texture feature values, calculates a texture distance between the two points x and y using weighting coefficients applied to multiple scales of a texture and the detected difference, and outputs the calculated texture distance to the color-texture distance generator 214. For example, the texture distance calculator 212 may calculate a texture distance $D_t(x, y)$ as expressed by Equation (13):

$$D_t(x, y) = \sum_{z=1}^{Z} W^z \sum_{k=1}^{K} |t_k^z(x) - t_k^z(y)| \quad (13)$$

where $W^z$ denotes the weighting coefficient applied to the multiple scales of a texture.

The color-texture distance generator 214 computes a color-texture distance using a color weight value $w_c$ (u', v') and a texture weight value $w_t$ (u', v') that vary depending on characteristics of segmented regions u' and v'. Here, the characteristics of the segmented regions u' an v' mean a texture degree t(u', v'), a size p(u', v') and a saturation s(u', v') for the segmented regions u' and v' marked in the fundamental region division map of FIG. 8. That is, the color-texture distance generator 214 multiplies a variable color weight value $w_c$ (u', v') and a variable texture weight value $w_t$ (u', v') by the color distance as expressed by Equation (10), (11), or (12) and the texture distance as expressed by Equation (13), respectively, adds the multiplication results to each other, and outputs the added result to the image graph simplification unit 38 as a color-texture distance through an output terminal OUT2.

Figure 11:
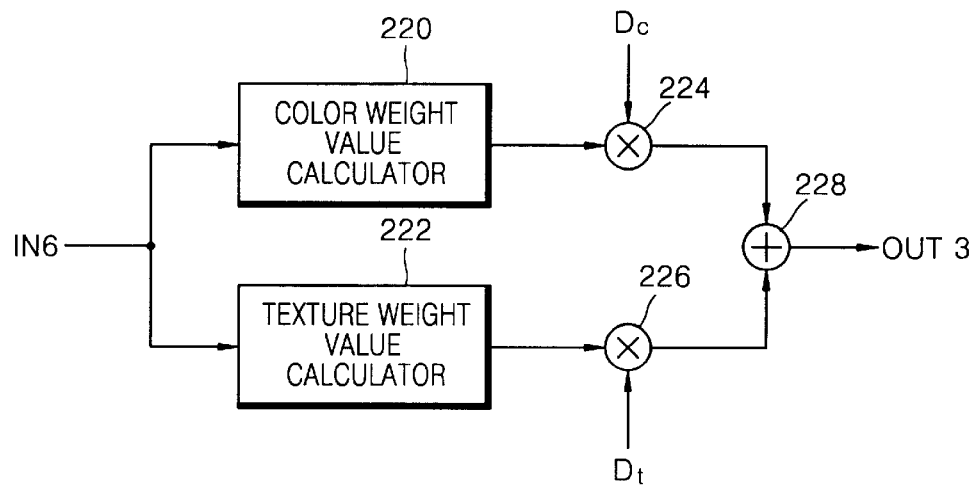
FIG. 11 is a block diagram of the color-texture distance generator of FIG. 10.

FIG. 11 is a block diagram of the color-texture distance generator 214 shown in FIG. 10. Referring to FIG. 11, the color-texture distance generator 214 includes a color weight value calculator 220, a texture weight value calculator 222, first and second multipliers 224 and 226, and an adder 228.

The color weight value calculator 220 shown in FIG. 11 calculates a color weight value $w_c$ (u', v') as expressed by Equation (14) and outputs the calculated color weight value to the first multiplier 224:

$$w_c(u', v') = \hat{w}_c + \hat{w}_t[1 - t(u', v')p(u', v')]s(u', v') \quad (14)$$

where $\hat{w}_c$ and $\hat{w}_t$ denote color and texture weighting constants, respectively. A texture degree t(u', v') is defined by Equation (15):

$$t(u', v') = \frac{T(u') + T(v')}{2 * T_{max}} \quad (15)$$

where $T_{max}$ denotes a maximum of texture degree. T(u') is defined by Equation (16):

$$T(u') = \sum_{z=1}^{Z} W^z \sum_{k=1}^{K} t_k^z(u') \quad (16)$$

where $t_k^z$(u') denotes an average texture feature value having a direction k at a size z of the region u'. A weight value $w^z$ denotes the weighting coefficient shown in Equation (13).

Furthermore, p(u' v') in Equation (14) is expressed by Equation (17):

$$p(u', v') = F\left[\frac{\min[P(u'), P(v')]}{P_O}\right] \quad (17)$$

where $P_o$ denotes a threshold value for the sizes of segmented regions marked in a fundamental region division map. s(u', v') in Equation (14) is expressed by Equation (18):

$$s(u', v') = 0.5 + 0.5F\left[\frac{\max[S(u'), S(v')]}{S_O}\right] \quad (18)$$

where $S_o$ denotes a saturation threshold value. Functions F in Equations (17) and (18) are used to suppress an adverse effect caused by extremely small-sized or low saturation regions. The texture weight value calculator 222 shown in FIG. 11 calculates a texture weight value $w_t$ (u', v') as expressed by Equation (19) and outputs the calculated texture weight value to the second multiplier 226:

$$w_t(u', v') = [1 - s(u', v')](\hat{w}_c + \hat{w}_t) + \hat{w}_t s(u', v')t(u', v')p(u', v') \quad (19)$$

The color weight value calculator 220 and the texture weight value calculator 222 shown in FIG. 11 input an average texture feature value through an input terminal IN6 (the input terminal IN6 corresponds to the input terminal IN5 shown in FIG. 10). Also, the color weight value calculator 220 and the texture weight value calculator 222 may receive as input required values among the color and texture weighting constants, the maximum of a texture degree, the average texture, the weighting coefficient, and the threshold values for the sizes and saturations of segmented regions marked in a fundamental region division map from the outside through the input terminal IN6, or may prestore them.

The first multiplier 224 multiplies the color weight value $w_c$ (u', v') output from the color weight value calculator 220 by a color distance $D_c$ as defined by Equations (10), (11) or (12) and outputs the multiplication result to the adder 228. The second multiplier 226 multiplies the texture weight value $w_t$ (u', v') output from the texture weight value calculator 222 by a texture distance $D_t$ as defined by Equation (13) and outputs the multiplication result to the adder 228. The adder 228 adds the multiplication result from the second multiplier 226 to the multiplication result from the first multiplier 224 and outputs the result as expressed by Equation (20) to the image graph simplification unit 38 through an output terminal OUT3 as a color-texture distance $\hat{D}$(u', v') required for simplifying an image graph.

$$\hat{D}(u', v') = w_c(u', v')D_c(u', v') + w_t(u', v')D_t(u', v') \quad (20)$$

where $D_c$(u',v') and $D_t$(u',v') denote color and texture distances, respectively.

As described above, the color weight value $w_c$ and the texture weight value $w_t$, which are utilized for calculating the color-texture distance used in the image graph simplification unit 38, are not predetermined values but variables. This is because the color-texture distance needs to be adjusted if the texture degrees, sizes and saturations of segmented regions vary. For example, if the sizes p(u',v') of the segmented regions u' and v' are less than the threshold value $P_o$ for the sizes of segmented regions, the color weight value $w_c$ (u', v') shown in Equation (20) increases while the texture weight value $w_t$ (u', v') decreases. If the texture degrees t(u',v') of the segmented regions u' and v' increase, the color weight value $w_c$ (u', v') decreases while the texture weight value $w_t$ (u', v') increases.

A process of performing step 30 by the image graph simplification unit 48 using the color-texture distance calculated as described above will now be described.

First, regions marked in the image graph output from the main region section unit 36 are arranged in order of decreasing size. Next, the color-texture distance between an arbitrary central region (hereinafter called "base region") and each of adjacent regions connected to the base region among the arranged regions is calculated using Equation (20). If the calculated color-texture distance is less than or equal to the second threshold value th2, the base region and the adjacent regions are merged. That is, the adjacent regions are merged into the base region. If the base region embraces its adjacent regions in this way, a portion of the image graph relating to the base region such as a connection relationship between the base region and each adjacent region needs to be modified as features of the base region such as color, texture, size, and edges change. The merging of a newly modified base region and its adjacent regions can be performed in the same manner. When the process of modifying the base region and merging adjacent regions into the modified base region is finished, the next largest region is newly designated as a base region to perform the region merging process again. The merging process is repeated until it has been performed on all regions marked in the image graph.

A process of simplifying the image graph cannot be perfectly conducted regardless of the second threshold value th2. To overcome this problem, the image graph simplification unit 38 may be divided into a plurality of sub-region merging portions. For this purpose, the color and texture weight values and the color and texture distances in Equation (20) are different in each sub-region merging portion, and the second threshold value th2 dynamically changes depending on the size of a region.

Figure 12:
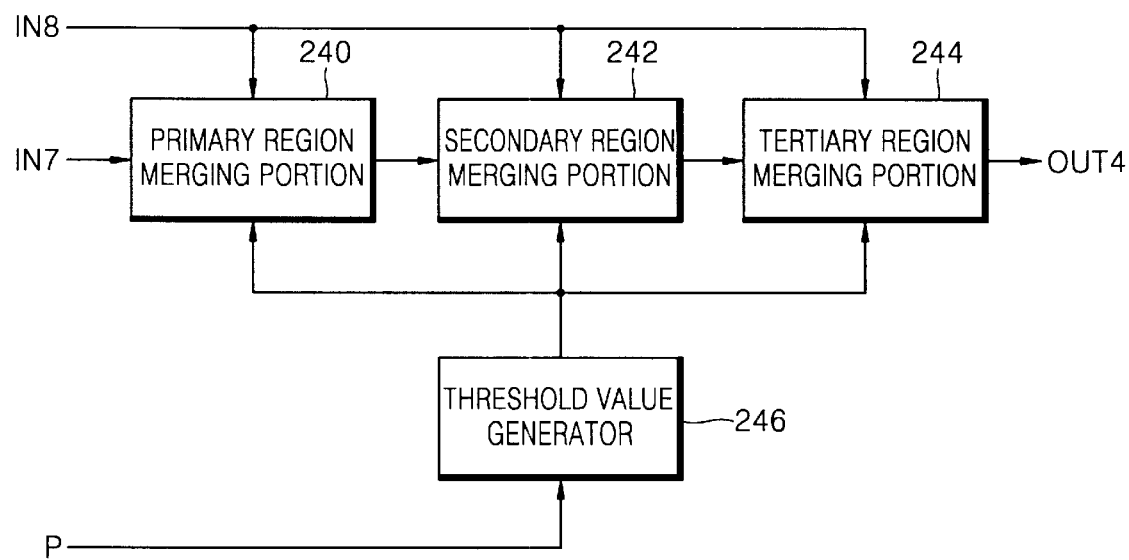
FIG. 12 is a block diagram of an image graph simplification unit.

More specifically, FIG. 12 is a block diagram of the image graph simplification unit 38. Referring to FIG. 12, the image graph simplification unit 38 includes primary, secondary, and tertiary region merging portions 240, 242 and 244, and a threshold value generator 246. The threshold value generator 246 dynamically changes the second threshold value th2 as expressed by Equation (21) and outputs the second threshold value th2 to the primary, secondary, and tertiary region merging portions 240, 242, and 244:

$$th2 = \alpha'\left(\frac{1}{P' + P'_O} + \beta'\right) \quad (21)$$

Here, P' denotes the size of a smaller region of two compared regions, and $P'_O$ is a constant representing a predetermined size that the smaller region can typically have. α denotes a threshold value constant and α'β' is a threshold value for a larger region of the two compared regions.

The primary region merging portion 240 compares the color-texture distance as defined by Equation (20) input through an input terminal IN8 with the second threshold value th2 received from the threshold value generator 246, merges two segmented regions u' and v' marked in the image graph input through an input terminal IN7 if the color-texture distance is less than or equal to the second threshold value th2, and outputs a first intermediate image graph reflecting the final result of merging in this way to the secondary region merging portion 242. The performance of the primary region merging portion 140 can be improved by gradually increasing the threshold value constant α' in Equation (21).

The secondary region merging portion 242 compares a first color-texture distance input through the input terminal IN8 with the second threshold value th2 received from the threshold value generator 246, merges two regions u" and v" marked in the first intermediate image graph if the first color-texture distance is less than or equal to the second threshold value th2, and outputs a second intermediate image graph reflecting the final result of merging in this way to the tertiary region merging portion 244. Here, the first color-texture distance is obtained by substituting into Equation (20) color and texture weight values calculated using Equations (14) and (19), respectively, when a color weighting constant $\hat{w}_c$ is set to "0", and texture and color distances calculated using Equation (13) and Equation (10), (11) or (12), respectively, when $W_H << W_B$, and $W_S << W_B$. That is, the first and second multipliers 224 and 226 of the color-texture distance generator 214 shown in FIG. 11 multiply a color weight value $w_c$ (u",v") and a texture weight value $w_t$ (u",v") output from the color weight value calculator 220 and the texture weight value calculator 222, respectively, when the color weighting constant $\hat{w}_c$ is '0', by a color distance and a texture distance, respectively, which are output from the color and texture distance calculators 210 and 212, respectively, when $W_H << W_B$, and $W_S << W_B$. In this case, the adder 228 adds the multiplication results to each other, and outputs the addition result to the image graph simplification unit 38 through the output terminal OUT3 as the first color-texture distance. This process can be performed only when the regions u" and v" have very low brightness.

The tertiary region merging portion 244 compares a second color-texture distance input through an input terminal IN8 with the second threshold value th2 received from the threshold value generator 246, merges two regions u'" and v'" marked in the second intermediate image graph if the second color-texture distance is less than or equal to the second threshold value th2, and outputs a final image graph reflecting the final result of merging in this way through an output terminal OUT4. Here, the second color-texture distance is obtained by substituting into Equation (20) color and texture weight values calculated when $\hat{w}_c << \hat{w}_t$ from the Equations (14) and (19), respectively, and color and texture distances calculated from Equation (10), (11) or (12) and Equation (13), respectively. That is, the first and second multipliers 224 and 226 of the color-texture distance generator 214 shown in FIG. 11 multiply a color weight value $w_c$ (u'", v'") and a texture weight value $w_t$ (u'", v'") output when $\hat{w}_t << \hat{w}_c$ from the color weight value calculator 220 and the texture weight value calculator 222, respectively, by a color distance and a texture distance, respectively. In this case, the adder 228 adds the multiplication results to each other, and outputs the addition result to the image graph simplification unit 38 through the output terminal OUT3 as the second color-texture distance. The tertiary region merging portion 244 can perform this process only when the regions u'" and v'" have large texture degrees.

Figure 13A:
FIGS. 13A, 14A and 15A show input or preprocessed images.
Figure 13B:
FIGS. 13B, 14B, and 15B show regions into which an image is sectioned by the method and apparatus for sectioning an image into a plurality of regions according to the present invention.
Figure 14A:
Figure 14B:
Figure 15A:
Figure 15B:

FIGS. 13A and 13B show an input or preprocessed image, and regions of the image sectioned by a method and apparatus for sectioning an image into a plurality of regions according to the present invention, respectively. FIGS. 14A and 14B show another input or preprocessed image, and regions of the image sectioned by a method and apparatus for sectioning an image into a plurality of regions according to the present invention, respectively. FIG. 15A and 15B show yet another input or preprocessed image, and regions of the image sectioned by a method and apparatus for sectioning an image into a plurality of regions according to the present invention, respectively. The image shown in FIGS. 13A, 14A, or 15A is segmented into a plurality of clusters of the same regions in the main region section unit 36, and the image graph simplification unit 38 merges the segmented regions in order to simplify them. In this case, a final image graph having information about the simplified result is used to obtain the image sectioned as shown in FIG. 13B, 14B, or 15B.

The method and apparatus for sectioning an image into a plurality of regions according to the present invention can be effectively used in digital interactive video systems. In concert with the popularization of digital broadcasting, much research is focused on developing a digital interactive video system which enables a user to directly and actively exchange information with a broadcaster instead of passively obtaining information by watching a broadcast. For example, in a digital interactive video system, if a user directly selects a desired object on a screen in TV dramas, movies, educational programs, advertisements, shopping programs, auctions, etc., which are broadcast, in order to obtain information about the desired object, the information is displayed on the screen. For example, the on-screen wardrobe of popular singers, furniture and characters displayed on TV dramas, ingredients and recipes required for cooking programs, and so on, may be meaningful to the user. If the user selects one of these meaningful objects, information about the selected object can be provided to the user. To accomplish this, meaningful objects existing in broadcast images need to be effectively distinguished. To effectively differentiate a region occupied by a meaningful object from a background or other objects, various features of the meaningful object should be utilized to the fullest. The features of the selected object may include color, texture and shape. In particular, color or texture gives a clue to simplifying the object into a single region. The method and apparatus for sectioning an image into a plurality of regions according to the present invention includes the use of a mean-shift analysis using all information about color feature values, texture feature values, and position on an image plane for each pixel. Thus, this invention provides a final image graph which can stably and clearly distinguish regions of image including the same color and texture feature values as well as regions including a three-dimensional object having shades gradually changing along an L-axis.

Furthermore, in a case where a selected object is composed of various colors or various textures, the method and apparatus for sectioning an image into a plurality of regions according to the present invention makes it possible to effectively distinguish a region of the meaningful object from other regions.

In addition, the method and apparatus for sectioning an image into a plurality of regions according to the present invention may also serve as a basic module in products and software relating to digital broadcasting.

Meanwhile, the method and apparatus for sectioning an image into a plurality of regions according to the present invention can effectively be used in searching for and recognizing a meaningful object existing in an image and tracking the meaningful object. That is, information about a region occupied by the meaningful object is extracted using a final image graph generated by the method and apparatus according to this invention. In this case, this invention can be used in searching or recognizing a screen on which an object having information similar to the extracted information was previously displayed, and tracking all screens on which an object having information similar to the extracted information was previously displayed. Furthermore, the extracted information may also be used in editing or manufacturing an image.

Furthermore, if only meaningful objects in an image to be compressed according to image compression standards such as MPEG are to be effectively transmitted, this invention can maximize transmission efficiency by compressing only extracted information more finely.

As described above, the method and apparatus for sectioning an image into a plurality of regions makes it possible to stably extract regions of an image having various features, that is, an image having shades, an image including a texture, or image of various color distributions in a form similar to what humans can perceive. Furthermore, this invention has a wide variety of applications as described above.

What is claimed is:

1. A method for sectioning an input image into a plurality of regions, the method comprising the steps of:

(a) converting each pixel of the input image into color coordinates in an arbitrary color space including a luminance (L) axis;

(b) partitioning the color space into a plurality of layers along the luminance (L) axis and partitioning each of the plurality of layers into a plurality of bins along color ($\alpha$ and $\beta$) axes;

(c) obtaining an upper last circle by a mean-shift analysis, the upper last circle encircling the largest number of pixels having features most similar to those of a base pixel located at a predetermined position within a bin having the largest number of pixels in the color space among bins included in an upper layer;

(d) obtaining a lower last circle by the mean-shift analysis, the lower last circle including the largest number of pixels having features most similar to those of a base pixel located at the same position as the center of the upper last circle in a lower layer adjacent to the upper layer;

(e) including the upper last and lower last circles in the same cluster if a distance between the centers of the upper last and lower last circles is less than a first threshold value, and if another lower layer adjacent to the lower layer exists, determining the lower layer and the adjacent lower layer as a new upper layer and a new lower layer, respectively, and returning to step (d);

(f) if the distance between the centers of the upper last and lower last circles is no less than the first threshold value or if the adjacent lower layer does not exist, partitioning the cluster using a last circle including the smallest number of pixels in the color space used in calculating an average color, an average texture, and an average position among the last circles included in the cluster; and (g) performing steps (c)–(f) on the remaining pixels not included in the upper last or the lower last circle and generating an image graph using clusters obtained for all pixels in the color space.

2. The method of claim 1, further comprising the steps of smoothing the input image a predetermined number times before step (a), wherein an arbitrary color space including the luminance (L) axis is an L$\alpha\beta$ color space, and in step (a), each pixel in the smoothed image is converted into color coordinates in the L$\alpha\beta$ color space.

3. The method of claim 2, after step (g), further comprising the step of comparing a color-texture distance with a second threshold value and merging regions marked in the image graph according to the comparison result to obtain a final image graph.

4. The method of claim 3, wherein step (c) comprises the steps of:

(c1) among pixels included in an upper arbitrary circle centered on the predetermined position, selecting only pixels whose texture feature values are less than a texture feature value of a pixel located at the center of the upper arbitrary circle and which are spaced apart less than a predetermined distance from the position of the pixel located at the center of the upper arbitrary circle on an image plane, and obtaining the average color, the average texture, and the average position on the image plane for the selected pixels;

(c2) determining whether a spacing degree obtained from differences between the averages and feature values of the base pixel at the center of the upper arbitrary circle is less than or equal to a first predetermined value in the L$\alpha\beta$ color space;

(c3) designating a pixel located at the position corresponding to the calculated average color as an imaginary base pixel if the spacing degree is greater than the first predetermined value, designating a texture feature value and a position on the image plane of the imaginary base pixel as the average texture and the average position on the image plane calculated in step (c1), determining a new upper arbitrary circle centered on the designated imaginary base pixel, and returning to step (c1); and (c4) determining the upper arbitrary circle as the upper last circle if the spacing degree is less than or equal to the first predetermined value and proceeding with step (d).

5. The method of claim 4, wherein step (d) comprises steps of:

(d1) among pixels included in a lower arbitrary circle having its center at the same position as the center of the upper last circle in the lower layer, selecting only pixels whose texture feature values are less than a texture feature value of a base pixel located at the same position as the center of the upper last circle and which are spaced apart less than a predetermined distance from a position of the base pixel on the image plane, and obtaining an average color, an average texture, and an average position on the image plane for the selected pixels;

(d2) determining whether a spacing degree obtained from differences between the averages calculated in the step (d1) and feature values of the base pixel at the center of the lower arbitrary circle is less than or equal to the first predetermined value in the L$\alpha\beta$ color space;

(d3) designating a pixel located at a position corresponding to the average color calculated in the step (d1) as an imaginary base pixel if the spacing degree of step (d2) is greater than the first predetermined value, designating the texture feature value and a position on the image plane of the imaginary base pixel as the average texture and the average position on the image plane calculated in the step (d1), determining a new lower arbitrary circle centered on the designated imaginary base pixel, and returning to the step (d1); and (d4) determining the lower arbitrary circle as the lower last circle if the spacing degree of step (d2) is less than or equal to the first predetermined value and proceeding with step (e).

6. The method of claim 5, wherein, in step (d1), if a distance $\Delta'$ between any pixel located in the lower arbitrary circle and a pixel located at the center of the lower arbitrary circle is less than a second predetermined value, an average color, an average texture, and an average position on an image plane for any pixel in the lower arbitrary circle are reflected in calculating the averages, and wherein the distance $\Delta'$ between the pixels is calculated according to the following equation:

$$\Delta' = \frac{\Delta X^2 + \Delta Y^2}{\sigma_G^2} + \frac{\Delta \alpha^2 + \Delta \beta^2}{\sigma_C^2} + \sum_{i'=1}^{K} \frac{\sum_{j'=1}^{Z} \Delta \theta_{i'j'}^2}{\sigma_{\theta_{i'}}^2}$$

where X and Y are positions on the image plane for each of the pixels, $\alpha$ and $\beta$ are color components in the color space, $\theta$ denotes a texture response, and $\sigma_G$, $\sigma_C$ and $\sigma_\theta$ are the predetermined distance by which the pixels are spaced apart from the position of the base pixel on the image plane, a radius of the lower arbitrary circle, and a texture distance representing the extent to which the texture feature value of the pixel is less than that of the base pixel, respectively.

7. The method of claim 4, wherein, in step (c1), if a distance $\Delta'$ between any pixel located in the upper arbitrary circle and a pixel located at the center of the upper arbitrary circle is less than a second predetermined value, an average color, a average texture, and an average position on an image plane for any pixel in the upper arbitrary circle are reflected when calculating the averages, and wherein the distance $\Delta'$ between the pixels is calculated according to the following equation:

$$\Delta' = \frac{\Delta X^2 + \Delta Y^2}{\sigma_G^2} + \frac{\Delta \alpha^2 + \Delta \beta^2}{\sigma_C^2} + \sum_{i'=1}^{K} \frac{\sum_{j'=1}^{Z} \Delta \theta_{i'j'}^2}{\sigma_{\theta_{i'}}^2}$$

where X and Y are positions on the image plane for each of the pixels, $\alpha$ and $\beta$ are color components in the color space, $\theta$ denotes a texture response, and $\sigma_G$, $\sigma_C$ and $\sigma_\theta$ are the predetermined distance by which the pixels are spaced apart from the position of the base pixel, a radius of the upper arbitrary circle, and a texture distance representing the extent to which the texture feature value of the pixel is less than that of the base pixel, respectively.

8. The method of claim 1, wherein the upper layer has a brightness level higher than a brightness level of the lower layer.

9. The method of claim 1, wherein the upper layer has a brightness level lower than a brightness level of the lower layer.

* * * * *